(12) United States Patent
Limotta

(10) Patent No.: US 11,801,948 B2
(45) Date of Patent: Oct. 31, 2023

(54) MACHINE LEARNING SYSTEM AND METHOD FOR ORBITAL TRAJECTORY PLANNING

(71) Applicant: Michael Limotta, Solvang, CA (US)

(72) Inventor: Michael Limotta, Solvang, CA (US)

(73) Assignee: ProximaAI.com, Solvang, CA (US)

( * ) Notice: Subject to any disclaimer, the term of this patent is extended or adjusted under 35 U.S.C. 154(b) by 814 days.

(21) Appl. No.: 16/823,077

(22) Filed: Mar. 18, 2020

(65) Prior Publication Data

US 2021/0292011 A1  Sep. 23, 2021

(51) Int. Cl.
| | | |
|---|---|---|
| *B64G 1/24* | (2006.01) | |
| *G06N 3/08* | (2023.01) | |
| *G06N 3/04* | (2023.01) | |
| *G06N 3/10* | (2006.01) | |
| *G06F 3/048* | (2013.01) | |

(52) U.S. Cl.
CPC ............... *B64G 1/242* (2013.01); *G06N 3/04* (2013.01); *G06N 3/08* (2013.01); *G06N 3/10* (2013.01); *G06F 3/048* (2013.01)

(58) Field of Classification Search
CPC ........ B64G 1/242; B64G 1/244; B64G 1/247; B64G 1/646; G06N 3/04; G06N 3/08; G06N 3/10; G06N 3/044; G06N 3/006; G06N 3/084; G06N 3/126; G06F 3/044
USPC .......... 701/10, 13, 14, 15, 16, 17, 18, 3, 4, 5
See application file for complete search history.

(56) References Cited

U.S. PATENT DOCUMENTS

| | | | | |
|---|---|---|---|---|
| 6,233,507 B1* | 5/2001 | May | .............. | B64G 1/244 701/13 |
| 8,768,622 B2* | 7/2014 | Healy | .............. | B64G 1/1085 701/13 |
| 9,919,813 B2* | 3/2018 | Healy | .............. | B64G 1/242 |
| 2007/0179685 A1* | 8/2007 | Milam | .............. | G01C 21/24 701/3 |

* cited by examiner

*Primary Examiner* — Hai H Huynh
(74) *Attorney, Agent, or Firm* — Blueshift IP, LLC; Robert Plotkin

(57) ABSTRACT

An orbital trajectory planning system includes a first computer processor environment configured to preprocess data for providing to a physics-based n-body simulation model, the first computer processor environment including a graphical user interface (GUI) for receiving input from a user. The system also includes a second computer processor environment running at least partially trained neural network software that has been trained to perform nonlinear mapping of the output of the n-body simulation model to a result related to a proposed trajectory for a spacecraft, the second computer processor environment receiving input information from the first computer processor environment. Further the system relates to a third computer processor environment configured to receive data related to the output from the neural network of the second computer processor environment, the third computer processor environment providing user useable output through a GUI running on the third computer processor environment.

21 Claims, 3 Drawing Sheets

MACHINE LEARNING SYSTEM AND METHOD FOR ORBITAL TRAJECTORY PLANNING

BACKGROUND

Over the years the number of objects orbiting the earth has grown steadily as well as interest in travelling to the moon, to mars, and other interplanetary travel. Every trip into space remains costly thus there is a need for lowering costs of each flight by minimizing fuel and delta-v for orbital planning as well as maximizing the number of tasks per trip into space. Multi-target rendezvous can serve multiple missions with less total launches, but each rendezvous comes with a cost. Potential missions include space debris removal, space debris and spacecraft avoidance, satellite or space station servicing, interplanetary exploration, and on-orbit servicing.

Conventionally, the best accepted method for finding optimal maneuvers for orbital transfers or rendezvous is evaluating them iteratively at different departure and arrival dates. One such method is the Lambert's Problem for orbit determination between two points in space given a specified time of flight. Generally, the solution to Lambert's Problem is arrived at numerically using iterative numerical methods. Thus, the number of computations required to solve Lambert's Problem within an iterative optimization process is time and resource consuming. Thus, there is a need for an automated trajectory planning tool that may be the basis for entirely robotic missions; i.e. no human planning, preparation, or execution for spaceflight. There is a need for an automated trajectory planning tool based on machine learning or artificial intelligence techniques.

SUMMARY

An illustrative embodiment relates to an orbital trajectory planning system. The system includes a first computer processor environment configured to preprocess data for providing to a physics-based n-body simulation model, the first computer processor environment including a graphical user interface (GUI) for receiving input from a user. The system also includes a second computer processor environment running at least partially trained neural network software that has been trained to perform nonlinear mapping of the output of the n-body simulation model to a result related to a proposed trajectory for a spacecraft, the second computer processor environment receiving input information from the first computer processor environment. Further the system relates to a third computer processor environment configured to receive data related to the output from the neural network of the second computer processor environment, the third computer processor environment providing user useable output through a GUI running on the third computer processor environment.

An illustrative embodiment also relates to a method of planning an orbital trajectory for a spacecraft. The method includes receiving input from a user through a graphical user interface (GUI) running on a first computer environment and preprocessing data, by the first computer processor environment. The method also includes receiving input information, by a second computer processor environment, from the first computer processor environment. The method also includes running at least partially trained neural network software, by a second computer processor environment, that has been trained to perform nonlinear mapping of the output of an n-body simulation model to a result related to a proposed trajectory for a spacecraft. Further, the method includes receiving data, by a third computer processor environment, the data being related to the output from the neural network of the second computer processor environment. Further still, the method includes providing post processing, by a third computer processor environment, the post processing based on inputs received from a user through a GUI running on the third computer processor environment.

A system of planning an orbital trajectory for a spacecraft includes a means for receiving input from a user through a graphical user interface (GUI) running on a first computer environment and a means for preprocessing data, by the first computer processor environment. The system also includes a means for receiving input information, by a second computer processor environment, from the first computer processor environment and a means for running at least partially trained neural network software, by a second computer processor environment, that has been trained to perform nonlinear mapping of the output of an n-body simulation model to a result related to a proposed trajectory for a spacecraft. The system further includes a means for receiving data, by a third computer processor environment, the data being related to the output from the neural network of the second computer processor environment. Further still, the system includes a means for providing post processing, by a third computer processor environment, the post processing based on inputs received from a user through a GUI running on the third computer processor environment.

In addition to the foregoing, other system aspects are described in the claims, drawings, and text forming a part of the disclosure set forth herein. The foregoing is a summary and thus may contain simplifications, generalizations, inclusions, and/or omissions of detail; consequently, those skilled in the art will appreciate that the summary is illustrative only and is NOT intended to be in any way limiting. Other aspects, features, and advantages of the devices and/or processes and/or other subject matter described herein will become apparent in the disclosures set forth herein.

BRIEF DESCRIPTION OF THE DRAWINGS

The use of the same symbols in different drawings typically indicates similar or identical items unless context dictates otherwise.

DETAILED DESCRIPTION

Figure 1:
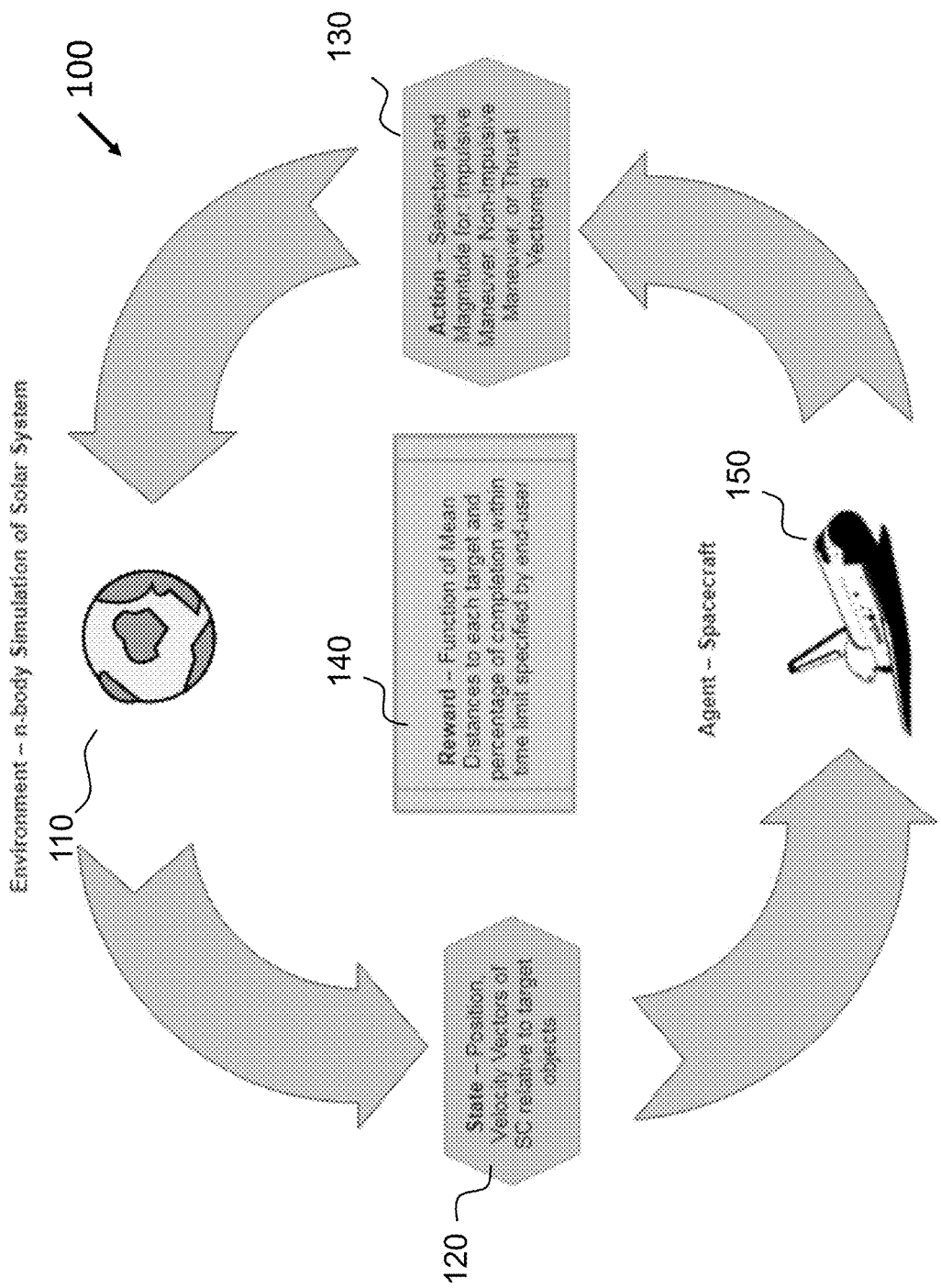
FIG. 1 is an illustrative embodiment of a system for generating a neural network-based orbital trajectory planner.

In accordance with illustrative embodiments, the system and methods described are advantageous to lower costs and risks for space agencies and commercial partners by minimizing fuel usage and delta-v for orbital planning, especially for multi-target missions. Multi-target rendezvous can serve multiple missions with less total launches. Potential missions include space debris removal, avoidance, interplanetary exploration, and on-orbit servicing, as well as others. Each additional rendezvous carries with it many costs in fuel and time in order to change orbital trajectories. On the other hand the more rendezvous that can be carried out per launch the more cost savings there may be possible. The system detailed here could potentially automate trajectory planning and optimize the number of rendezvous per flight.

An artificial neural network (ANN) is a system that, due to its topological structure, can adaptively learn nonlinear mappings from input to output space when the network has a large database of prior examples from which to draw. In some sense, an ANN simulates human functions such as learning from experience, generalizing from previous to new data, and abstracting essential characteristics from inputs containing irrelevant data. Using an ANN for propulsion system modelling, without the need for significant physical modeling or insight, may be highly advantageous because in an ANN, the source terms are highly nonlinear functions of the input parameters. Hence, linear interpolation is not an appropriate approach to their modeling, unless each parameter of the data set is divided into an enormous number of small increments.

The basic architecture of a neural network includes layers of interconnected processing units called neurons (comparable to the dendrites in the biological neuron) that transform an input vector $[c1, c2, \ldots, cM]T$ into an output vector$[a1n, a2n, \ldots, aSn]T$. Neurons without predecessors are called input neurons and constitute the input layer. All other neurons are called computational units because they are developed from the input layer. A nonempty subset of the computational units is specified as the output units. All computational units that are not output neurons are called hidden neurons.

The universal approximation theorem states that a neural network with one hidden layer, utilizing a sigmoid transfer function, is able to approximate any continuous function f: $RM \rightarrow R\ S2$ (where M and S2 are dimensions of the function domain and range, respectively) in any domain, with a given accuracy based, in part, on the amount of training data. Features of the input data are extracted in the hidden layer with a hyperbolic tangent transfer function and in the output layer with a purely linear transfer function. Based on the theorem and thanks to the topological structure of the neural network, one can generate complex data dependencies without performing time-consuming computations. However, any neural network application depends on the training or learning algorithm. The learning algorithm is the repeated process of adjusting weights to minimize the network errors. These errors are defined by $e=t-a$, where t is the desired network output vector and $a=a(c, [W])$ is the actual network output vector, a function of the input data and network weights. This weight adjustment is repeated for many training samples and is stopped when the errors reach a sufficiently low level.

The majority of neural network applications are based on the backpropagation algorithm. The term backpropagation refers to the process by which derivatives of the network error, with respect to network weights and biases, are calculated, from the last layer of the network to the first. The Levenberg-Marquardt backpropagation scheme is one such technique used to optimize neural network weights. However, any other applicable method may be used without departing from the scope of the invention.

A recurrent neural network (RNN) is a class of artificial neural networks where connections between nodes form a directed graph along a temporal sequence. This allows it to exhibit temporal dynamic behavior. Unlike feedforward neural networks, RNNs can use their internal state (memory) to process sequences of inputs. This makes them applicable to tasks such as unsegmented, connected handwriting recognition or speech recognition as well as modelling of the dynamics of an orbital trajectory.

Reinforcement learning (RL) is an area of machine learning concerned with how software agents ought to take actions in an environment in order to maximize some notion of cumulative reward. Reinforcement learning is one of three basic machine learning paradigms, alongside supervised learning and unsupervised learning. Reinforcement learning differs from supervised learning in not needing labelled input/output pairs be presented, and in not needing sub-optimal actions to be explicitly corrected. Instead the focus is on finding a balance between exploration (of uncharted territory) and exploitation (of current knowledge).

In accordance with illustrative embodiments Artificial Neural Network (ANN) models may be stored on a cloud server with connections over the internet to end-user devices. These ANNs may be used to provide launch window predictions much prior to the launch window itself.

Referring to FIG. 1, an illustration of an orbital trajectory planner learning platform 100 is depicted. In such a platform 100, the Environment or a n-body Simulation of the solar system 110 may provide information to the ANN depicted as State 120 of a spacecraft 150. State 120 may include but is not limited to Position and Velocity vectors of the Spacecraft relative to target objects. Any or all of the State information may be raw data or preprocessed, modelled, interpolated, extrapolated, or approximated data. The ANN training sets may include outputs which may be actions 130, such as but not limited to magnitude for impulsive maneuvers, non-impulsive maneuvers, or thrust vectoring. In the deep reinforcement learning construct a reward 140 may be used which may be, but is not limited to, the function of mean distance to each target and the percentage of completion within a time limit specified by the end-user.

In accordance with an illustrative embodiment, any of a variety of techniques may be used to train the ANNs including, but not limited to Reinforcement Learning, Deep Reinforcement Learning, Levenberg-Marquardt, Gradient Descent-based learning methods for back propagation, Newton, Quasi-Newton, Conjugate Gradient, etc. The models themselves may consist of Deep Neural Networks and Recurrent Neural Networks. Some of the input data, both for training and in use may require preprocessing. For example, simulation of environment of the n-body problem. This is just one example of preprocessing data and the scope of the invention is not limited to using this specific preprocessed data or preprocessed data.

Under the assumption that the physics simulation 110 of the n-body problem is ideal and matches most real-world conditions, the model should perform similar to the simulated one. However, as new data is obtained, or requirements change, those can be inputted into the simulation and re-run.

In accordance with an illustrative embodiment trajectory action plans may be predicted with a Recurrent Neural Network, due to the data source has a time-series. As the n-body problem changes, the RNN will provide new estimates. Training the neural networks may be done using Adam optimization or classical stochastic gradient descent among many other possible training methodologies.

Figure 2:
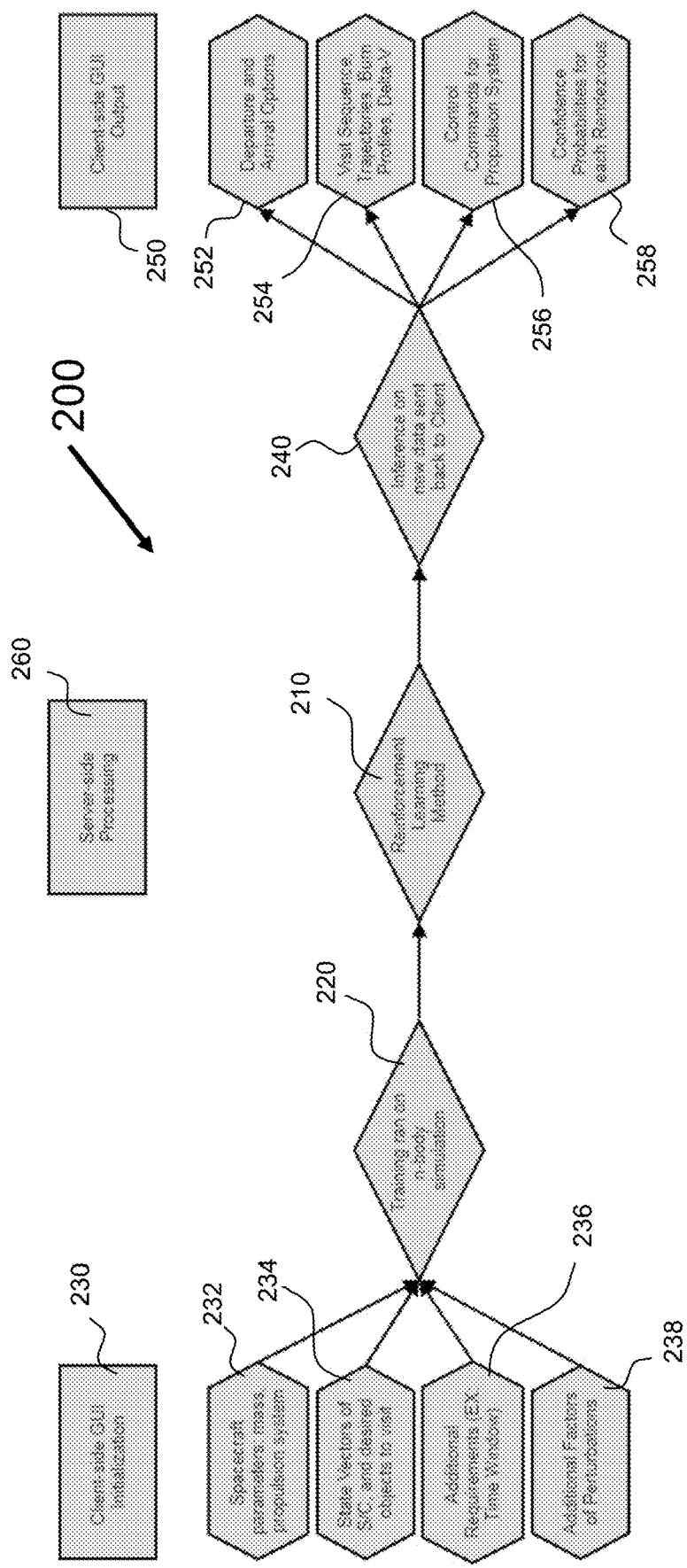
FIG. 2 is an illustrative embodiment of a flow diagram for pre-processing of data for a neural network-based orbital trajectory planner.

Referring now to FIG. 2, a flow diagram 200 for orbital trajectory planning using a machine learning technique is depicted. A reinforcement learning (RL) model 210 receives information from a physics engine, in this case a model of a n-body problem 220 is used to provide inputs to the RL model 210. The N-body problem model 220 receives numerous inputs from a graphical user interface initialization 230, the inputs include, but are not limited to spacecraft parameters 232 (e.g., mass, propulsion system, etc.), state vectors of an initial spacecraft position and all targets to visit 234, additional requirements 236 (e.g. time windows), additional factors of perturbations 238 (e.g., atmospheric drag, solar radiation pressure, oblateness, frame dragging, etc.).

Output of RL model 210 is provided to an inference engine 240 which is configured to provide post processing on RL model 210 decisions converting the RL model decisions to client useable information through client-side GUI 250, such as departure and arrival options 252, visit sequence, trajectories, burn profiles, delta-v 254, control commands for propulsion system 256, and confidence probabilities for each rendezvous 258, among others. In some instances, inference engine 240 may be a deep learning or other type of neural network capable of converting the output of the RL model to useable output information as displayed by client-side GUI output 250.

The RL model 210 may be a deep reinforcement learning model with the following definitions:
 a) Agent—Spacecraft (SC)—containing at least a Propulsion System, GN&C
 b) Environment—3D Physics Engine (n-body Simulation of Solar System)
 c) Reward—Function of Mean Distances to each target and percentage of completion within time limit specified by end-user
 d) Action—Selection and Magnitude for: Impulsive Maneuver, Non-Impulsive Maneuver, or Thrust Vectoring
 e) State—Position, Velocity Vectors of SC relative to target objects The RL model is not limited to these definitions which are propose as exemplary definitions. Other configurations may be used without departing from the scope of the invention.

N-body simulation model 220 includes the primary objects of the Solar System which may be contained within the simulation environment: for example, the sun, planets, moons, dwarf planets, etc. Additional objects like asteroids or man-made objects may be added as needed. Implementing many objects with varying orders of masses will provide higher accuracy.

In some exemplary embodiments, more than one neural network can be used each carrying out different portions of the simulation and linked from output of one network to inputs of another network. Also, any of a variety of neural network paradigms may be applied in any combination in order to most effectively provide high performance simulation results.

The high degree of nonlinearity and adaptivity of the neural network paradigms applied provide the ability to model the highly nonlinear nature of the environmental conditions that are being modelled. The training of the networks may be done using any of a variety of methods including, but not limited to Adam optimization and stochastic gradient descent methods.

As an alternative to finding a policy for the spacecraft control agent through Deep Reinforcement Learning, there are other related techniques that may be trained within the simulation environment without departing from the scope of the invention. Such algorithms and techniques include but are not limited to Evolutionary Algorithms and Genetic Algorithms for example.

Figure 3:
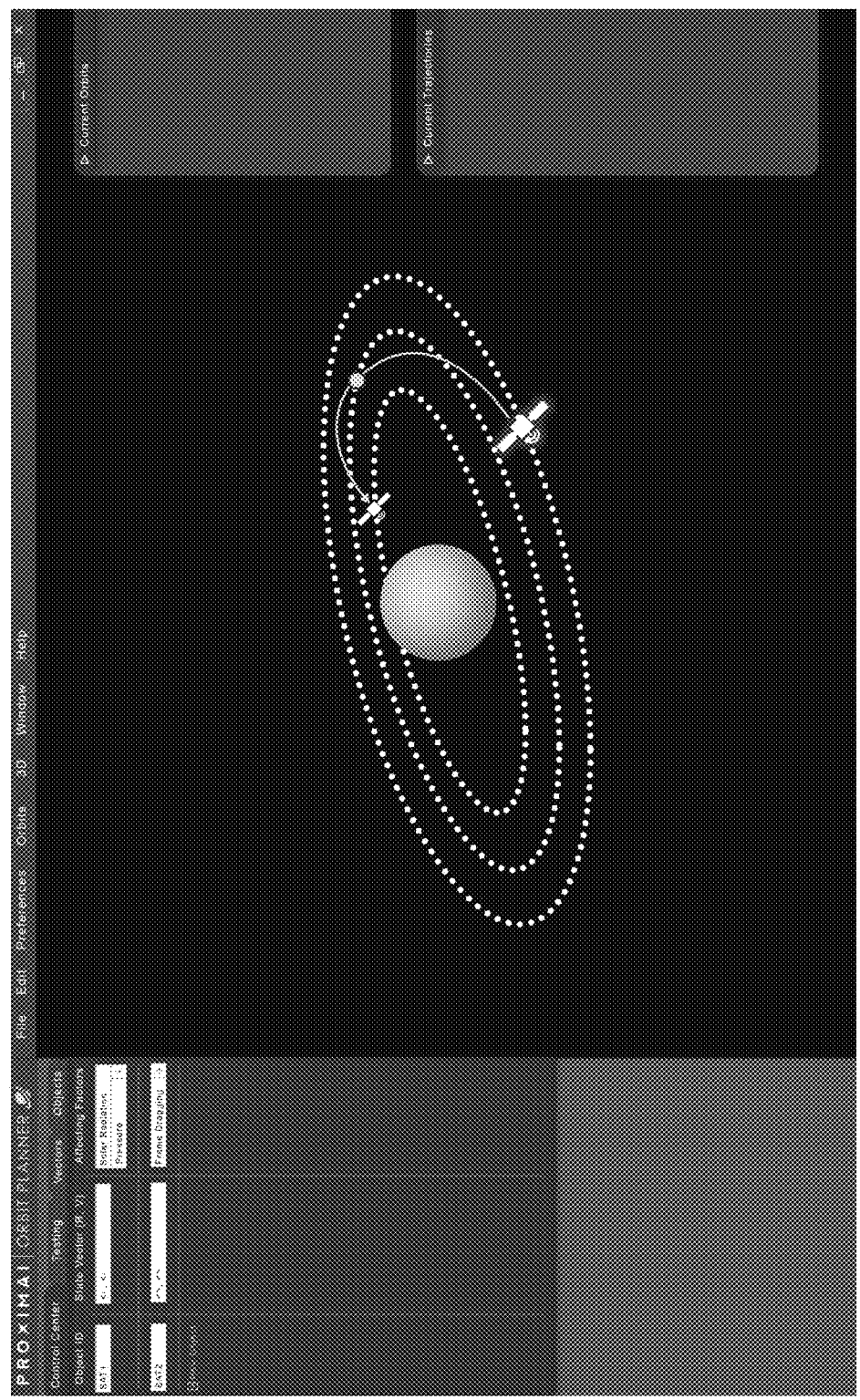
FIG. 3 is an exemplary embodiment of a graphical user interface for a neural network-based orbital trajectory planner.

Referring now to FIG. 3, a client Graphical User Interface (GUI) 300 is depicted. GUI 300 shows fields for input data, such as but not limited to state vectors and affecting factors, e.g., etc. GUI 300 also includes a graphical representation of orbits and rendezvous planned or proposed trajectories as well as output data like current orbits and current trajectories, e.g. GUI 300 may include more or less information than is depicted in FIG. 3 without departing from the scope of the invention. As well, the look and feel of GUI 300 may vary without departing from the scope of the invention.

The orbital trajectory planning system described may be dependent on an aggregate of experimental data and tests, and not approximated to fit a mathematical model. It may have options for traditional non-impulsive maneuvers, but also discover through training various unconditional maneuvers that may be exceptionally efficient.

Inference by ANN models rely on GPU hardware, which is becoming easy and cheap to access. This tool may become the foundation of an AI pilot that is able to self-navigate across the solar system, performing orbital maneuvers under fuel and propulsion constraints. Conventional tools or systems have been unable to perform at this level.

In some instances, one or more components may be referred to herein as "configured to," "configured by," "configurable to," "operable/operative to," "adapted/adaptable," "able to," "conformable/conformed to," etc. Those skilled in the art will recognize that such terms (e.g. "configured to") generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

What is claimed is:

1. An orbital trajectory planning system, comprising:
   a first computer processor environment configured to preprocess data for providing to a physics-based n-body simulation model, the first computer processor environment including a graphical user interface (GUI) for receiving input from a user;
   a second computer processor environment running at least partially trained neural network software that has been trained to perform nonlinear mapping of the output of the n-body simulation model to a result related to a proposed trajectory for a spacecraft, the second computer processor environment receiving input information from the first computer processor environment; and
   a third computer processor environment configured to receive data related to the output from the neural network of the second computer processor environment, the third computer processor environment providing user useable output through a GUI running on the third computer processor environment.

2. The orbital trajectory planning system of claim 1, wherein the first and third computer processor environments are running on the same computer.

3. The orbital trajectory planning system of claim 1, wherein the first, second, and third computer processor environments are running on the same computer.

4. The orbital trajectory planning system of claim 1, wherein the second computer processor environment may run one or more of more than one configuration of neural network software.

5. The orbital trajectory planning system of claim 1, wherein the neural network software comprises a multilayer perceptron network.

6. The orbital trajectory planning system of claim 1, wherein the neural network software comprises a reinforcement learning neural network.

7. The orbital trajectory planning system of claim 1, wherein the neural network is trained based on trajectory data from a real-world measurement data.

8. The orbital trajectory planning system of claim 1, wherein the neural network is trained based on a reward function that includes mean distance to a target error.

9. The orbital trajectory planning system of claim 1, wherein the neural network is trained based on percentage of completion of objectives within a specified time period.

10. The orbital trajectory planning system of claim 1, wherein he inputs to the neural network include position, velocity vectors of the spacecraft relative to target objects.

11. The orbital trajectory planning system of claim 1, wherein the inputs to the neural network include additional factors of perturbation.

12. The orbital trajectory planning system of claim 1, wherein the neural network output includes parameters related to a recommended trajectory of the spacecraft.

13. The orbital trajectory planning system of claim 1, wherein the preprocessing includes at least simulating spacecraft flight trajectories.

14. A method of planning an orbital trajectory for a spacecraft, comprising:
    receiving input from a user through a graphical user interface (GUI) running on a first computer environment;
    preprocessing data, by the first computer processor environment;
    receiving input information, by a second computer processor environment, from the first computer processor environment;
    running at least partially trained neural network software, by a second computer processor environment, that has been trained to perform nonlinear mapping of the output of an n-body simulation model to a result related to a proposed trajectory for a spacecraft;
    receiving data, by a third computer processor environment, the data being related to the output from the neural network of the second computer processor environment; and
    providing post processing, by a third computer processor environment, the post processing based on inputs received from a user through a GUI running on the third computer processor environment.

15. The method of claim 14, wherein the first and third computer processor environments are running on the same computer.

16. The method of claim 14, wherein the first, second, and third computer processor environments are running on the same computer.

17. The method of claim 14, wherein the second computer processor environment may run one or more of more than one configuration of neural network software.

18. The method of claim 14, wherein the neural network software comprises a multilayer perceptron network.

19. The method of claim 14, wherein the neural network software comprises a reinforcement learning neural network.

20. The method of claim 14, wherein the neural network is trained based on trajectory data from a real-world measurement data.

21. A system of planning an orbital trajectory for a spacecraft, comprising:

a means for receiving input from a user through a graphical user interface (GUI) running on a first computer environment;
a means for preprocessing data, b the first computer processor environment;
a means for receiving input information, by a second computer processor environment, from the first computer processor environment;
a means for running at least partially trained neural network software, by a second computer processor environment, that has been trained to perform nonlinear mapping of the output of an n-body simulation model to a result related to a proposed trajectory for a spacecraft;
a means for receiving data, by a third computer processor environment, the data being related to the output from the neural network of the second computer processor environment; and
a means for providing post processing, by a third computer processor environment, the post processing based on inputs received from a user through a GUI running on the third computer processor environment.

\* \* \* \* \*